United States Patent [19]
Djupsjöbacka et al.

[11] Patent Number: 5,522,004
[45] Date of Patent: May 28, 1996

[54] DEVICE AND METHOD FOR DISPERSION COMPENSATION IN A FIBER OPTIC TRANSMISSION SYSTEM

[75] Inventors: Anders G. Djupsjöbacka; Olof G. Sahlén, both of Solna, Sweden

[73] Assignee: Telefonaktiebolaget LM Ericsson, Stockholm, Sweden

[21] Appl. No.: 352,109

[22] Filed: Nov. 30, 1994

Related U.S. Application Data

[63] Continuation of Ser. No. 235,512, Apr. 29, 1994, abandoned.

[30] Foreign Application Priority Data

Apr. 30, 1993 [SE] Sweden .................. 9301500

[51] Int. Cl.$^6$ .................. G02B 6/02; G02F 1/00
[52] U.S. Cl. .................. 385/123; 385/24; 385/45; 385/49; 359/109; 359/173
[58] Field of Search .................. 385/1–3, 14, 15, 385/24, 45, 49, 123; 359/109, 111, 127, 140, 173, 179, 186, 188, 195

[56] References Cited

U.S. PATENT DOCUMENTS

| | | | |
|---|---|---|---|
| 3,821,549 | 6/1974 | Gloge | 250/227.11 X |
| 3,988,614 | 10/1976 | Kapron et al. | 250/227.11 X |
| 4,077,701 | 3/1978 | Steensma et al. | 385/24 X |
| 4,405,199 | 9/1983 | Ogle et al. | 250/227.11 X |
| 4,658,224 | 4/1987 | Thylén et al. | 332/7.51 |
| 4,953,947 | 9/1990 | Bhagavatula | 385/126 |
| 4,969,710 | 11/1990 | Tick et al. | 385/123 |
| 5,042,906 | 8/1991 | Chesler et al. | 385/123 |
| 5,093,876 | 3/1992 | Henry et al. | 385/28 |
| 5,218,662 | 6/1993 | Dugan | 385/123 |
| 5,224,194 | 6/1993 | Islam | 385/122 |
| 5,274,733 | 12/1993 | Prigent et al. | 385/123 |
| 5,289,550 | 2/1994 | Plastow | 385/9 |
| 5,303,079 | 4/1994 | Gnauck et al. | 359/188 |

FOREIGN PATENT DOCUMENTS

| | | | |
|---|---|---|---|
| 256808 | 2/1988 | European Pat. Off. | 385/24 X |
| 256809 | 2/1988 | European Pat. Off. | 385/147 X |
| 409260 | 1/1991 | European Pat. Off. | 385/24 X |
| 428151 | 5/1991 | European Pat. Off. | 385/147 X |
| 464812 | 1/1992 | European Pat. Off. | 385/147 X |
| 475376 | 3/1992 | European Pat. Off. | 385/147 X |
| 482461 | 4/1992 | European Pat. Off. | 385/147 X |
| 478484 | 4/1992 | European Pat. Off. | 385/24 X |
| 524758 | 1/1993 | European Pat. Off. | 385/147 X |
| 463739 | 4/1985 | Sweden | 385/147 X |

OTHER PUBLICATIONS

A. Djupsjöbacka, "Residual Chirp in Integrated–Optic Modulators," *IEEE Photonics Tech. Lett.* vol. 4, No. 1, pp. 41–43 (Jan. 1992).

A. H. Gnauck et al., "Dispersion Penalty Reduction Using an Optical Modulator with Ajustable Chirp," *IEEE Photonics Tech. Lett.* vol. 3, No. 10, pp. 916–918 (Oct. 1991).

H. Gysel et al., "Electrical Predistortion to Compensate for Combined Effect of Laser Chirp and Fibre Dispersion," *Elec. Lett.* vol. 27, No. 5, pp. 421–423 (Feb. 28, 1991.

N. Henmi et al., "10–Gb/s, 100–km Normal Fiber Transmission Experiment Employing a Modified Prechirp Technique," *Proc: OFC 91*, paper TuO2 (1991) (No Month).

(List continued on next page.)

*Primary Examiner*—Brian Healy
*Attorney, Agent, or Firm*—Burns, Doane, Swecker & Mathis

[57] ABSTRACT

The present invention relates to a device and a method respectively for dispersion compensation in a fibre optic transmission system in which an optic signal is fed to the device. The device comprises an optic separating device for spectral optic splitting of the optic input signal into two branches in an upper and lower modulation sideband, a delay device for selective delay of the spectral bands in relation to one another, and a combining device for combining the sidebands.

26 Claims, 6 Drawing Sheets

OTHER PUBLICATIONS

H. Isadpanah et al., "Multiwavelenth Dispersion–Compensation for 1550 nm Transmission at 2.5 and 10 Gb/s Over 1310 nm–Optimized Single–Mode Fiber," *Proc: EPOC '92*, paper TuA5.1 (1992) (No Month).

T. L. Koch et al., "Dispersion Compensation by Active Predistorted Signal Synthesis," *J. of Lightwave Technology* vol. LT–3, No. 4, pp. 800–805 (Aug. 1985).

S. K. Korotky et al., "High–Speed, Low Power Optical Modulator with Adjustable Chirp Parameter," *Integrated Photonics Research*, pp. 53–54 (1991) (No Month).

F. Koyama et al., "Frequency Chirping in External Modulators," *J. of Lightwave Technology* vol. 6, No. 1, pp. 87–93 (Jan. 1988).

M. S. Lin et al., "Nearly Dispersion–Penalty–Free Transmission Using Blue–Shifted 1.55–µm Distributed Feedback Lasers," *IEEE Photonics Tech. Lett.* vol. 2, No. 10, pp. 741–742 (Oct. 1990).

C. M. Miller, "Characteristics and Applications of High Performance Tunable, Fiber Fabry–Perot Filters," *Proc: ECTC '91* (1991) (No Month).

T. Okiyama et al., "10 Gb/s Transmission in Large–Dispersion Fiber Using a Ti:LiNbO$_3$ Mach–Zehnder Modulator," *Proc: IOOC '89*, paper 20D4–5 (1989) (No Month).

J. J. O'Reilly et al., "Microstrip Compensation of Mibre Chromatic Dispersion in Optically Amplified Coherent Systems," *IEE Colloquium on Microwave Optoelectronics*, No. 139, pp. 13/1–13/6 (1990) (No Month).

T. Saito et al., "Prechirp Technique for Dispersion Compensation for a High–Speed Long–Span Transmission," *IEEE Photonics Tech. Lett.* vol. 3, No. 1, pp. 74–76 (Jan. 1991).

L. Thylén et al., "Bandpass Response Traveling–Wave Modulator with a Transit Time Difference Compensation Scheme," *J. of Lightwave Technology* vol. LT–3, No. 1, pp. 47–51 (Feb. 1985).

K. Sasayama et al., "Coherent Optical Transversal Filter Using Silica–Based Single–Mode Waveguides", *Electronics Letters*, Oct. 26, 1989, vol. 25, No. 22, pp. 1508–1509.

DEVICE AND METHOD FOR DISPERSION COMPENSATION IN A FIBER OPTIC TRANSMISSION SYSTEM

This application is a continuation of application Ser. No. 08/235,512, filed Apr. 29, 1994, now abandoned.

BACKGROUND

The present invention relates to a system and a method respectively for dispersion compensation in a fibre optic high speed communication system. Fibre optic transmission systems or more particularly fibre optic high speed systems are being used in communication in various ways, as for instance in telecommunication and over long transmission distances. Certain networks, as for instance national networks, demand very high transmission speeds, often 2.5 Gbit/s but the transmission speed may also be considerably higher, for instance 10 Gbit/s and more. The transmission speed is however limited by the occurance of dispersion between transmitter and receiver. The dispersion starts to give rise to problems at approximately 2.5 Gbit/s. At 10 Gbit/s it gives rise to a considerable limitation due to the fact that the information band width itself gives rise to dispersion. Problems with dispersion thus occur at high speeds and long distances. In ordinary single-mode fibres the significance of dispersion increases at bit rates higher than 2.5 Gbit/s for wavelengths of approximately 1.55 μm. At often utilized repeater-distances of approximately 60 kilometers, the effect is significant at 10 Gbit/s. Thus, it is of great importance that the dispersion is limited as much as possible, in order to achieve as long transmission distances as possible.

A number of devices and methods, respectively, for compensation of the dispersion in fibre optic transmission systems, in particular high speed systems, have been proposed.

A number of known solutions are based on so called prechirp technology. This is based on the fact that the frequency/wavelength of the laser is modulated during each pulse. The frequency spectrum is distorted in such a way that the pulse in the fibre converges. Both directly and externally modulated systems are known, and usually the laser achieves the prechirp effect in both cases. An example of such a device is described for instance in "Dispersion Compensation by Active Predistorted Signal Synthesis", T. L. Koch, R. C. Alferness, J. of Lightwave Technology, Vol. LT-3, No. 4, (1985), pages 800–805. At 1.05 μm and for an ordinary single-mode fibre it is required that the signal should blue-shift. By direct modulation, a laser normally red-shifts during the pulse. Usually the laser is FM modulated for obtaining the chirp, after which the AM modulation is applied by means of an external modulator. In for instance "10 Gb/s 100-km normal fiber transmission experiment employing a modified prechirp technique", N. Henmi, T. Saito, M. Yagamushi, S. Fujita, Proc: OFC'91, (1991), paper Tu02, it is described how selected DFB lasers are utilized. With a so called blue-shift modulation in the transmitter, see for instance "Frequency Chirping in External Modulators", F. Koyoma, K. Iga, J. of Lightwave Technology, Vol. LT-6, No. 1, (1988), pages 87–93, the FM/AM modulated signal is obtained in an external modulator whereby the laser functions without any influence. In order to obtain the required modulation it is normally required that the external modulator be designed in a special way. Both in the case where the laser carries out the prechirp function and where an external modulator carries out the prechirp function, there is a wish to obtain a blue-shifted pulse. Both the prechirp generation and the blue-shift modulation in the transmitter utilize the dispersion in order to achieve a pulse compression.

By means of another known device, the transmission is made dispersion-free by adding an additional length of fibre which has a reversed sign of the dispersion, this is described for instance in "Multiwavelength Dispersion Compensation for 1550 nm Transmission at 2,5 Gb/s Over 1310 nm Optimized Single-Mode Fiber", H. Izadpanah, C. Lin, K. Runge, M. Z. Iqbal, J. L. Gimlett, Proc: ECOC'92, (1992), paper TuA5.1. A device where an already laid-out fibre is utilized means that a dispersion-compensating fibre may be arranged before the receiver. The compensating fibre length can be approximately a third of the transmission distance. This gives a number of disadvantages due to the fact that the extra fibre or fibre length is expensive, it demands a special design and it also adds attenuation. In the above-mentioned document the losses are limited by arranging a fibre amplifier between the transmission fibre and the dispersion compensation fibre, which further complicates the system and makes it more expensive.

A number of devices are also known by which the dispersion compensation of the signal is carried out on the receiving side of the transmission system. An example is described in "Microstrip Compensation of Fibre Chromatic Dispersion in Optically Amplified Coherent Systems", J. J. O'Reilly, M. S. Chauldry, Proc: EII Colloquium on Microwave Optoelectronics, No 139, (1990), pages 13/1–13/6. This device is based on phase compensation of the frequency spectrum of the received signal, which counteracts the phase difference which the different partial frequencies have received in the laid-out fibre. This device, as well as others of the same kind, requires the use of heterodyne technology in the receiver. However, this is a complex and expensive technique. In the document described, the phase distortion is treated at an intermediate frequency. A mixer is arranged which consists of an optic direction coupler which is fed by a signal and local oscillator, a detector diode and a bandpass filter, and which only lets through the difference frequency. The phase correcting element is formed by a microstrip conductor having a normal dispersion. The microstrip conductor can for instance be 10–20 cm long and compensates for the dispersion in a fibre of a couple of hundred kilometers. After that, the electric signal is detected in a normal way.

European Patent Application No. 0 256 809 describes a device for dispersion compensation which is based on a multi-mode structure as dispersion compensating element. The signal is divided in a number of partial wavelengths which can then propagate over distances of equal lengths but with different group velocity. For digital communication systems in the Gbit/s range, the relative delay time may be in the order of 100 ps. A time difference of this size is hard to carry out with concepts which are based on the fact that the partial wavelengths shall travel the same distance but with different group velocities, the losses thereby giving rise to serious problems. Furthermore, a device of this sort is not flexible.

European Patent Application 0464812 describes a device in which a fibre is made dispersion-free by joining a number of elements having opposite signs of the dispersion for a given wavelength. The signal is split into several partial wavelengths which may propagate different distances in space, and through the use of a lattice a number of wavelengths are obtained. This device is based on so called "free-space"-communication which means that no waveguides exist and the difference in distance should be approximately 3 cm in order to achieve a time difference of approximately 100 ps. Even if the difference in distance may itself be obtained through the device, it will become sensitive to interference and badly suited for large-scale production. Furthermore, the device suffers from a lack of stability.

SUMMARY

The object of the present invention is to define a device and a method respectively for, as far as is possible, eliminating the influence of dispersion in fibre optic transmission systems, especially high speed systems. An object of the invention is thus to lengthen the transmission distance in dispersive-limited systems. Furthermore, it is an object of the invention to define a device and a method respectively which is cheap and simple to produce and well suited for large-scale production. It is another object that the device should have stability and that it should be suitable for production as a hybrid as well as an integrated circuit. A particular object is to define a device and a method respectively for transmission speeds of 10 Gb/s and more. Furthermore, the device should provide great flexibility in connection with the design of the dispersion compensating device and delay distances of different lengths should be easily obtainable as well as that it should offer a possibility to provide optic amplifiers in the signal path. A further object of the invention is to define a device and a method respectively through which very long transmission distances, as well as very high transmission speeds, are possible. Another object of the invention is that the compensation of dispersion may be carried out at the receiving side without the need to utilize heterodyne technology. It is also an object that the device may be arranged somewhere in the transfer chain of the transmission system.

A device by which these as well as other objects are achieved comprises an optical separator for spectrally splitting an input optical signal into at least two parts, a delay device for selectively time delaying the signal parts to compensate a difference between the signal parts transmission times due to optical fiber dispersion, and a combiner for combining the compensated signal parts.

A method by which the objects are achieved comprises the steps of splitting an optical input signal into an upper part and a lower part, selectively delaying the parts to compensate for a difference between the parts' transit times due to the optical fiber's dispersion, and combining the compensated upper and lower parts.

If, in a transmission system, the transmission is carried out in a format resulting in double sidebands around the carrier wave, the dispersion will lead to the frequencies in the received signal spectrum being delayed different amounts in relation to each other. The so called blue sideband will be delayed a shorter time than the red sideband. Through optic filtering the two sidebands are separated from each other so that the blue sideband is delayed in relation to the red one before they are joined in a proper way with regard to the phase. Thereafter, according to one embodiment they may be detected in a manner known per se.

A measure of how much the signal has been distorted may be obtained by calculating a weighted RMS value of the phase difference in the interval where signal power is present.

$$RMS = 2\sqrt{\frac{\int_0^{\omega_{Cl}} P(\omega)(\Delta\phi)^2 d\omega}{\omega_{Cl}}} = \frac{2D_2L}{\sqrt{\omega_{Cl}}}\sqrt{\int_0^{\omega_{Cl}} P(\omega)(\omega^2 - C\omega\omega_{Cl})^2 d\omega}$$

Here, $P(\omega)$ defines the power spectrum of the signal. $\omega_{C1}$ denotes the angular frequency for the system clock which furthermore is proportional to the bit rate, B denotes the bit rate, L denotes the transfer distance, $\Delta L$ is the distance in the delay loop in the receiver which is proportional to the dispersion parameter in the fibre $D_2$, and $v_g$ denotes the group velocity in the delaying medium. C is dimensionless and is chosen so that the RMS value is minimized, which is equivalent to minimizing the integral in the above-mentioned equation. In the equation, there is a minus sign in front of C due to the fact that if a signal is being delayed a positive distance, it will be "left behind" with regard to the phase. For simplicity, the weight function $P(\omega)$ is set =1. The frequency scale is translated so that the carrier wave has 0 in angular frequency and the time scale is chosen so that a 0 phase difference is obtained for the carrier wave. Furthermore, the delay is chosen so that the "red" sideband is delayed the distance $-C.\omega_{C1}D_2Lv_g/2$, whereas the "blue" sideband is delayed the distance $C.\omega_{C1}D_2Lv_g/2$. In this manner, the symmetry is utilized and twice the RMS value is calculated. Calculations give the RMS values for half the interval with or without compensation, respectively. Without compensation, an RMS value of $$RMS = \frac{2D_2L}{\sqrt{5}} \omega_{Cl}^2 = K \cdot D_2LB^2$$

is obtained, whereas the RMS value with compensation is given by $$RMS = \frac{D_2L}{2\sqrt{5}} \omega_{Cl}^2 = \frac{K}{4} \cdot D_2LB^2$$

In accordance with the compensation algorithm described above, the transmission distance might increase maximally by a factor 4 in relation to a non-compensated case. The optimal delay distance may be expressed as $$\Delta L = C\omega_{C1}D_2Lv_g$$

BRIEF DESCRIPTION OF THE DRAWINGS

The invention will be described in the following in greater detail with reference to the accompanying drawings, with an explanatory and by no means limiting purpose, where FIG. 1 generally illustrates a first embodiment of the invention in which the separation device consists of a splitter and two filters.

DETAILED DESCRIPTION

In fibre optic systems, dispersion in the form of phase distortion of the second order is normally taken into consideration. Phase distortion of the third order is only significant in ultra high speed systems, i.e. over 40 Gbit/s and then only in those cases where one is very close to the dispersion-free wavelength in the fibre. Otherwise it is the phase distortion of the second order which is the dominating parameter for the dispersion in the fibre.

In general, the invention is based on the fact that a spectral time compensation is carried out in the receiver or somewhere in the transfer chain of the system (if the system is linear). The signal received by the device is separated into two spectral halves. These are delayed in relation to one another by permitting them to propagate distances of different lengths in two separate single-mode waveguides but with essentially the same group velocity, i.e. a selective time delay is achieved. The group velocities for the modulation sidebands are substantially the same, i.e. it is desired that they shall be the same but naturally they may differ slightly or insignificantly from one another due to the fact that these waveguides also have dispersion. Furthermore, single-mode waveguides and single-mode technology is used.

Figure 1:
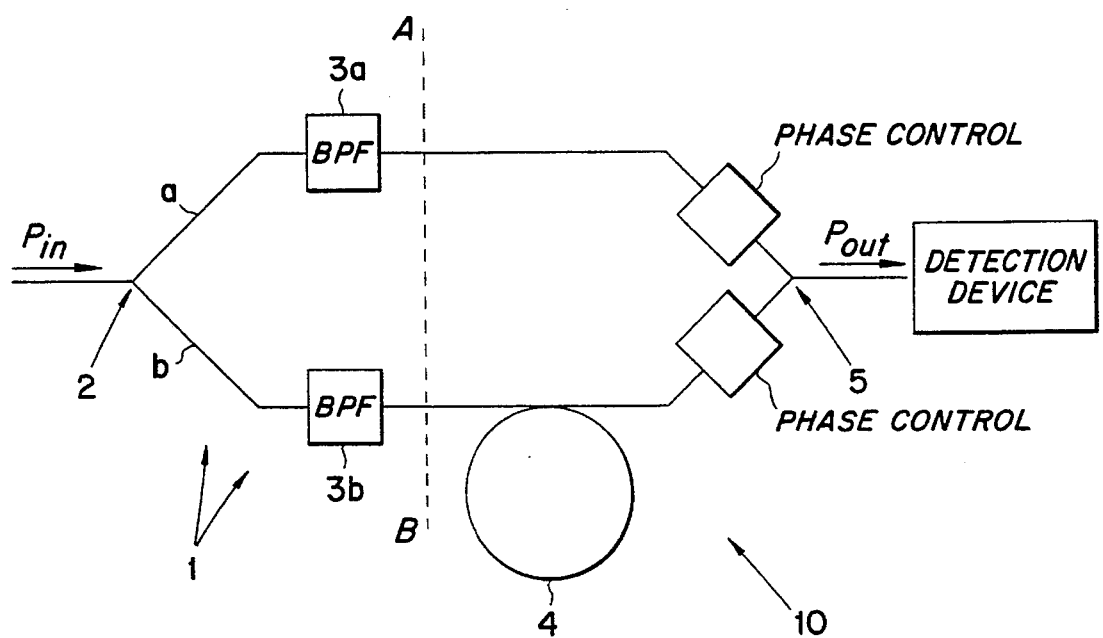

In FIG. 1 there is illustrated a first embodiment of the device. The device 10 for dispersion compensation is in this case arranged at the receiving side in a fibre optic transmission system. In accordance with the invention, there is no need to apply heterodyne technology. An incoming optic signal $P_{in}$ is fed to a separating device 1 which comprises a splitter 2 which for instance is formed by a passive 3 dB coupler. It is then split into two branches a,b, in each of which there is arranged an optic bandpass filter 3a, 3b which each filters out a sideband of the modulated signal. In the illustrated section A–B, a spectrally cut out sub-set of the total spectrum is consequently obtained. The optic bandpass filters 3a, 3b can for instance be formed by so called Fabry-Perot filters. The sideband having propagated with the smallest amount of delay in the fibre is then delayed in a delay device 4 which, in the shown example, is formed by a delay line. The signals are then combined in the two branches a, b to a common output in a combining device 5. This signal combining is coherent, which normally implies an active control of the phase in one of the branches. In order to achieve this phase control, for instance the electro-optic power in a phase modulator, temperature control or some other known method may be used (not shown). Thereafter, the signal may be detected by a detection device (not shown) in a known manner. In accordance with the example illustrated in FIG. 1, the device is arranged at the receiving side. This is however not necessary, because if the system is linear it may in principle be arranged anywhere in the transmission chain. The detection device is normally suited to be arranged at the receiving side only.

Figure 2:
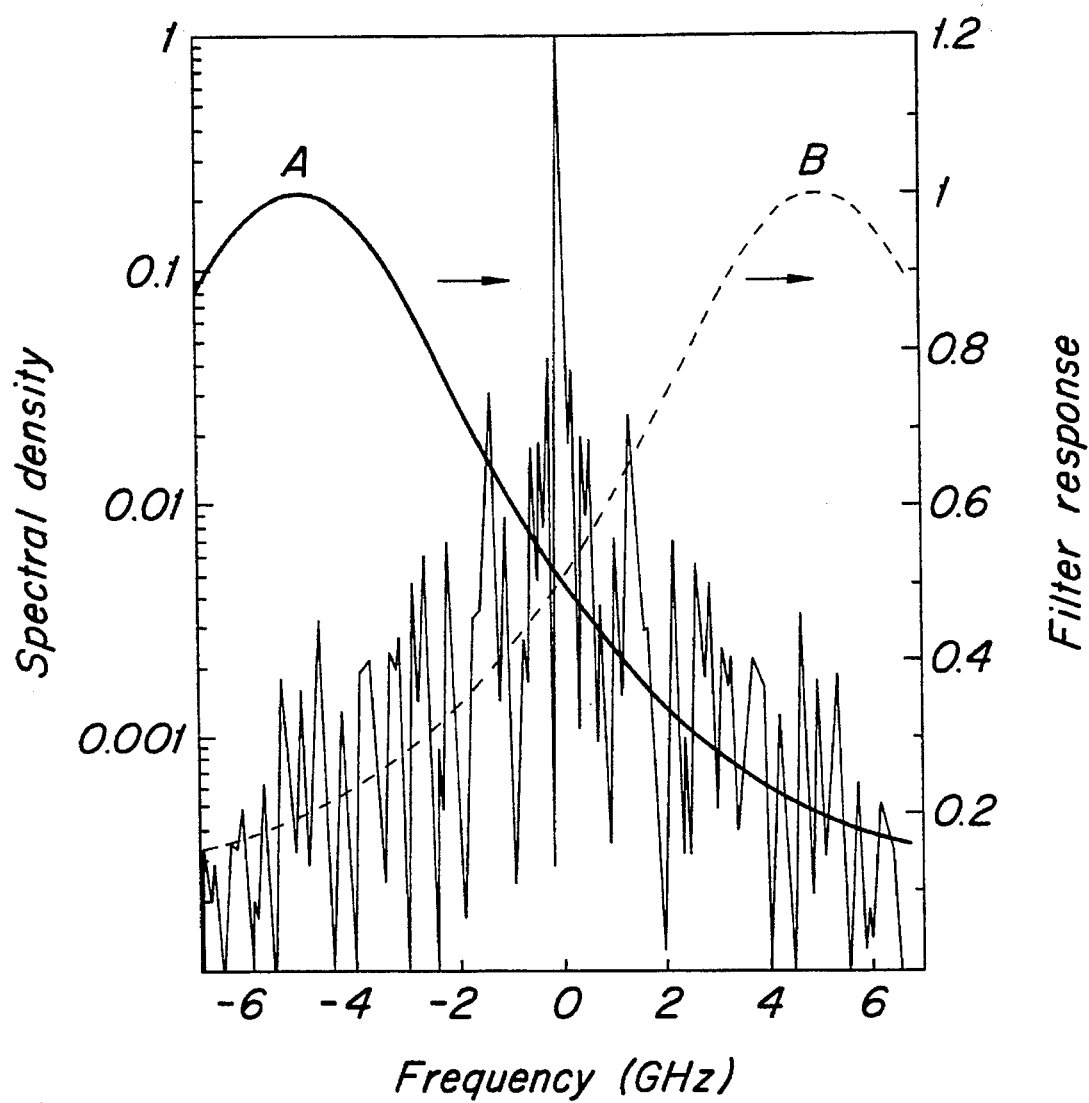
FIG. 2 illustrates a power spectrum for the modulated optic signal and filter characteristics for the Fabry-Perot filter in the device in accordance with FIG. 1.

In FIG. 2 there is illustrated the power spectrum for the modulated optic signal for a possible embodiment in accordance with FIG. 1. In this connection, the transmitter may for instance be constituted by a laser diode whose light has been intensity-modulated by an absorption modulator with a fade-out of approximately 9 dB and without chirp. $P_{in}$ may be a so called 10 Gb/s pseudo-random word. The electric input signal is deemed to be electrically filtered through an RC link with a rise time of 25 ps. Furthermore, the signal was transmitted on a standard, non dispersion-shifted fibre with 16 ps/nm/km dispersion. The filters in the shown example, so called Fabry-Perot interferometers with a bandwidth of 10 Ghz, are adjusted to filter out the upper and the lower sidebands, respectively. The finesse of the filters, F is in the illustrated embodiment equal to 192 with an ordinal number, M, which is equal to 100 and a mirror reflectance, R, of 98,4%. The delay time, T, is optimized for each fibre length in order to obtain a negligible power penalty. In the figure, the spectrum is translated so that the frequency of the optic carrier wave is transferred to the origin of coordinates for the sake of clarity. In FIG. 2 the transmitted optic power spectrum is shown in which the transfer functions, i.e. the filter characteristics, for the Fabry-Perot filters are marked. The specified values merely indicate examples of an embodiment which of course may vary in a number of ways.

Figure 3:
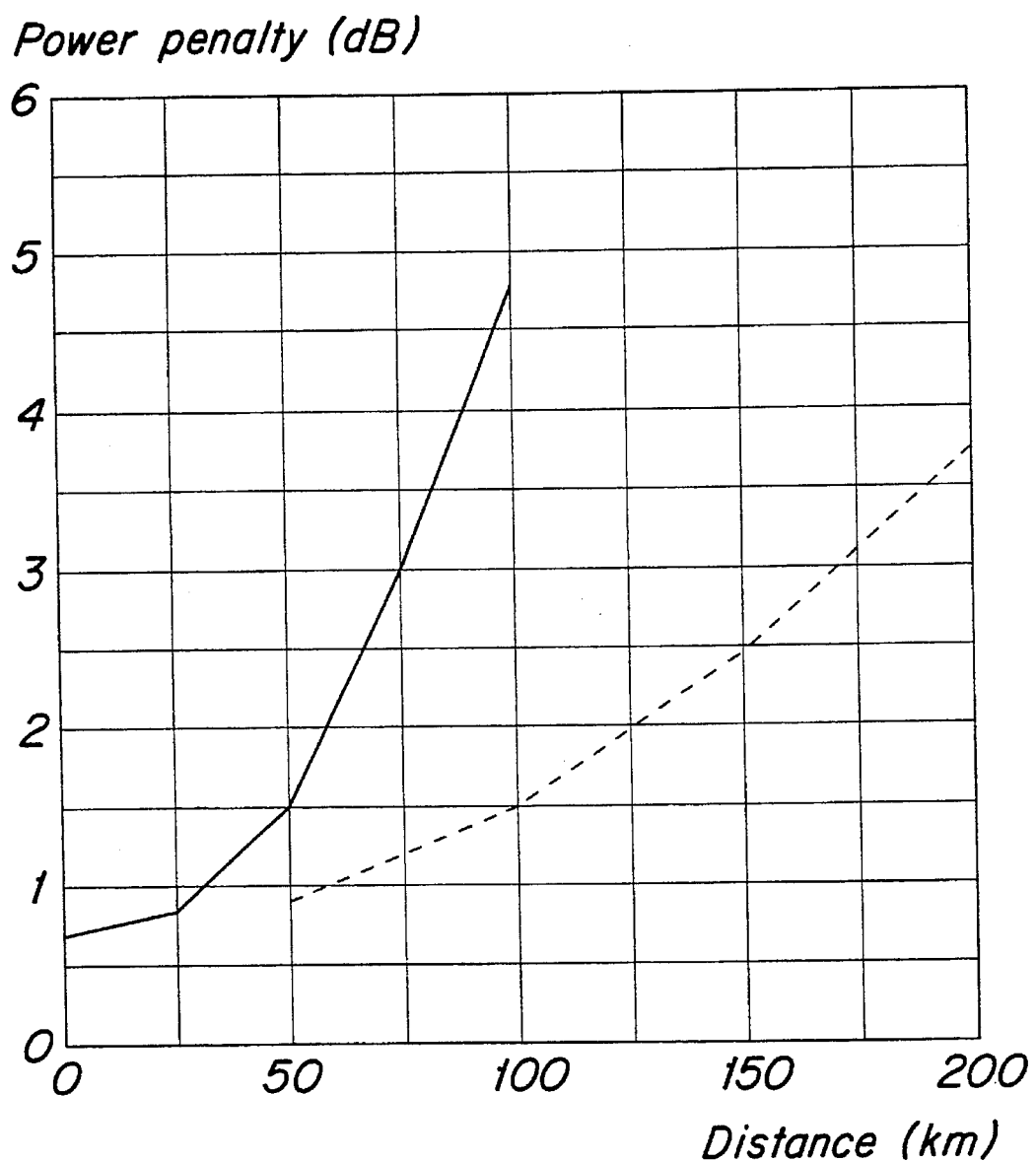
FIG. 3 illustrates the "power penalty" as a function of the distance with and without dispersion compensation respectively of the device in accordance with FIG. 1.

In FIG. 3, values of the "power penalty" are illustrated as a function of the length of the transmission fibre with and without dispersion compensation, respectively, in accordance with the example of FIG. 1. In this connection, a broken line illustrates the case with dispersion compensation while a continuous line illustrates the case without dispersion compensation. The delay times T in the case with dispersion compensation vary within the interval from 25 ps (fibre of 50 kilometers) to 100 ps (fibre of 200 kilometers). In the figure only the power penalty caused by the dispersion and by limitations in the bandwidth in the transmitter is shown, whereas influence from attenuation in the fibre and noise from the receiving circuit as well as any possible optic amplifier are not taken into account. As is apparent, the transmission distance, being defined as the length of fibre for which a 3 dB power penalty is obtained, may be increased by a factor of approximately 2.3, this constituting only one example for a certain device, however.

As has been mentioned above, for instance a fibre optic 3 dB splitter may be utilized as well as two fibre Fabry-Perot filters and an optic delay line 4. This may have a length of 2 cm and a delay time T of 100 ps. This is however only stated for exemplifying purposes and a number of other solutions are of course possible. In order to obtain an active phase control in one of the branches which has been mentioned above, one of the fibres may for example be heated before the coupler 5, but in accordance with an alternative embodiment it is also possible to expose it to a mechanical pressure. In both cases, small but sufficient changes of refractive index may be achieved in order to obtain a coherent combining of the signals in the combining device. In accordance with another embodiment, it is possible to arrange an electro-optic phase compensator in one of the branches (not shown).

It has been assumed in the above that all included components are independent of the polarization. However, this is not imperative; if a dependence of the polarization is present, some kind of polarization control must however be exercised at the input side.

In accordance with an alternative embodiment to discrete components, the entire device may be integrated on a semiconducting substrate which may for instance be formed by GaAs or InP. InP may for instance be suitable if the component should be used at a wavelength of approximately 1550 nm. In these cases, the waveguides consist of single-mode waveguides produced by conventional epitaxial and etching methods. With monolithic integration on semiconductors, for instance resonant laser amplifier filters, DFB or DBR lasers which operate as narrow-band amplifying filters may be used as filters. Since InP-waveguides have a greater refractive index than glassfibre, the delay lengths in the delay device 4 will become smaller, for instance in a case corresponding to the above-mentioned one with a delay time of approximately T=100 ps, the distance would become approximately 0.9 cm.

With a monolithic integrated device, the detection device may also be integrated monolithically, as also electric preamplifiers in the form of transistors. Furthermore, a phase control may be performed by including a short section of, for example, some tenths of a millimeter, which is forwardly or backwardly biased in order to obtain a precise control of the refractive index. In accordance with a further alternative embodiment, it is possible to integrate an optic amplifying section at the input side in the form of a laser amplifier. The described device may also be produced in the form of single-mode waveguides of materials such as for instance polymers or silicon dioxide. Furthermore, it is not necessary that the included filters 3a, 3b consist of Fabry-Perot filters or, in the case with monolithic integration, laser amplifier filters, but any filter may be utilized provided that its transfer function is sufficiently narrow.

Figure 4:
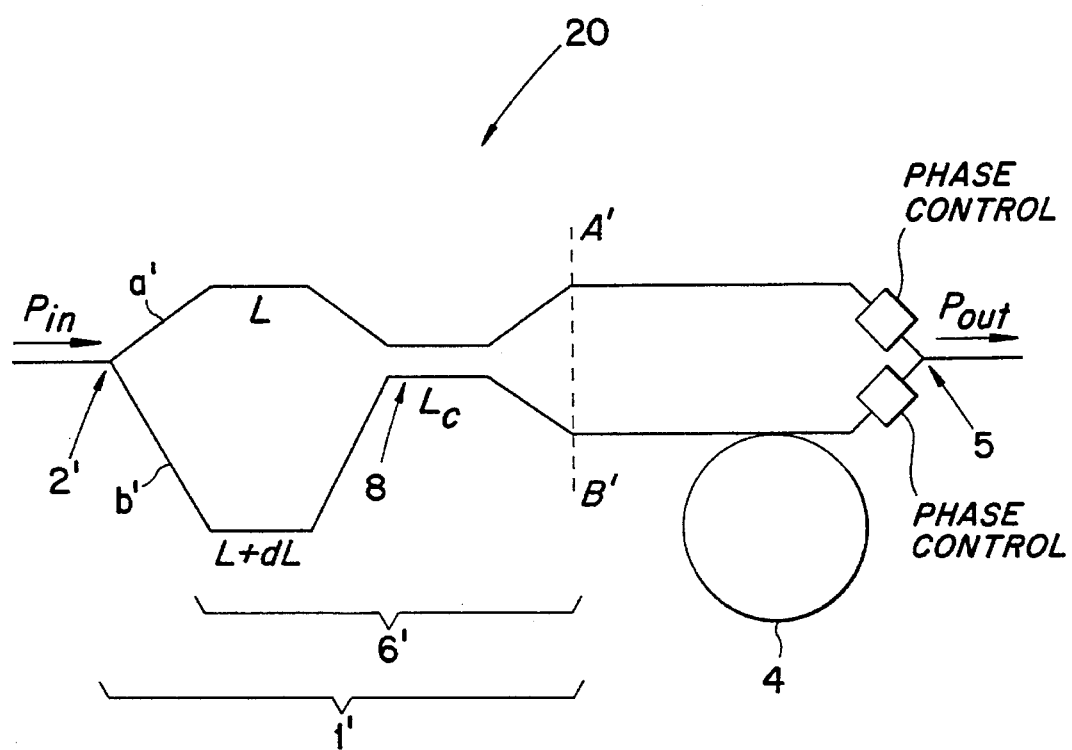
FIG. 4 illustrates an alternative embodiment of the device in which the separation device comprises a splitter, a device for sorting wavelengths and a direction coupler.

In FIG. 4, an alternative embodiment of the invention is illustrated in which the separating device 1' comprises a splitter and a wavelength-sorting device 6. An advantage with this embodiment is that essentially all the light may be used so that a part of it is not lost by the splitting at the input side with a subsequent out-filtering in the respective branch. In the device 20 illustrated in FIG. 4, the incoming optic signal $P_{in}$ is split into two branches a', b' which are of different lengths, L; L+dL. Thereafter, the light is combined in a directional coupler 8 which may have a length amounting for instance to half a coupling length. In accordance with one embodiment, the two branches a', b', together with the directional coupler, form a so called Mach-Zender interferometer which carries out a periodic "sorting" of the wavelenghts so that half of all the incoming wavelengths appear in the upper branch a', whereas one half appears in the lower branch b' as measured in the section A'–B'. By means of a suitable selection of dL, i.e. that which corresponds to the difference in length between the two branches, a periodicity is obtained which places one of the modulation sidebands essentially in "a'", while the other modulation sideband is placed essentially in "b'". In a manner which is analogous to the embodiment described in FIG. 1, the sideband which is delayed with the least amount in the transmission fibre is delayed in an analogous manner in the delay device 4, after which the two signals are combined in the combining device 5, which may be a directional coupler. Also in this case an active phase control is performed immediately before the combining device 5 or the direction coupler in order to obtain a coherent combination of the signals. The direction coupler has a symmetric output.

In accordance with one embodiment, the device 20 described in FIG. 4 consists of discrete fibre components such as fibre splitter 2', fibre coupler 8, a delay device 4 (especially in the form of a delay line) as well as phase control.

In accordance with another embodiment, the device 20 may correspond to the one described in FIG. 4, but may be produced through monolithic integration on a semiconducting substrate such as for example GaAs or InP, or it may be integrated in polymers or silicon dioxide analogous to that which has been described with reference to FIG. 1.

The separating device 1' does not have to consist of a splitter 2' and a Mach-Zender interferometer, but instead of the Mach-Zender interferometer any other suitable kind of wavelength-sorting device may be used. The wavelength-sorting device may for instance be based on a or grating.

Figure 5:
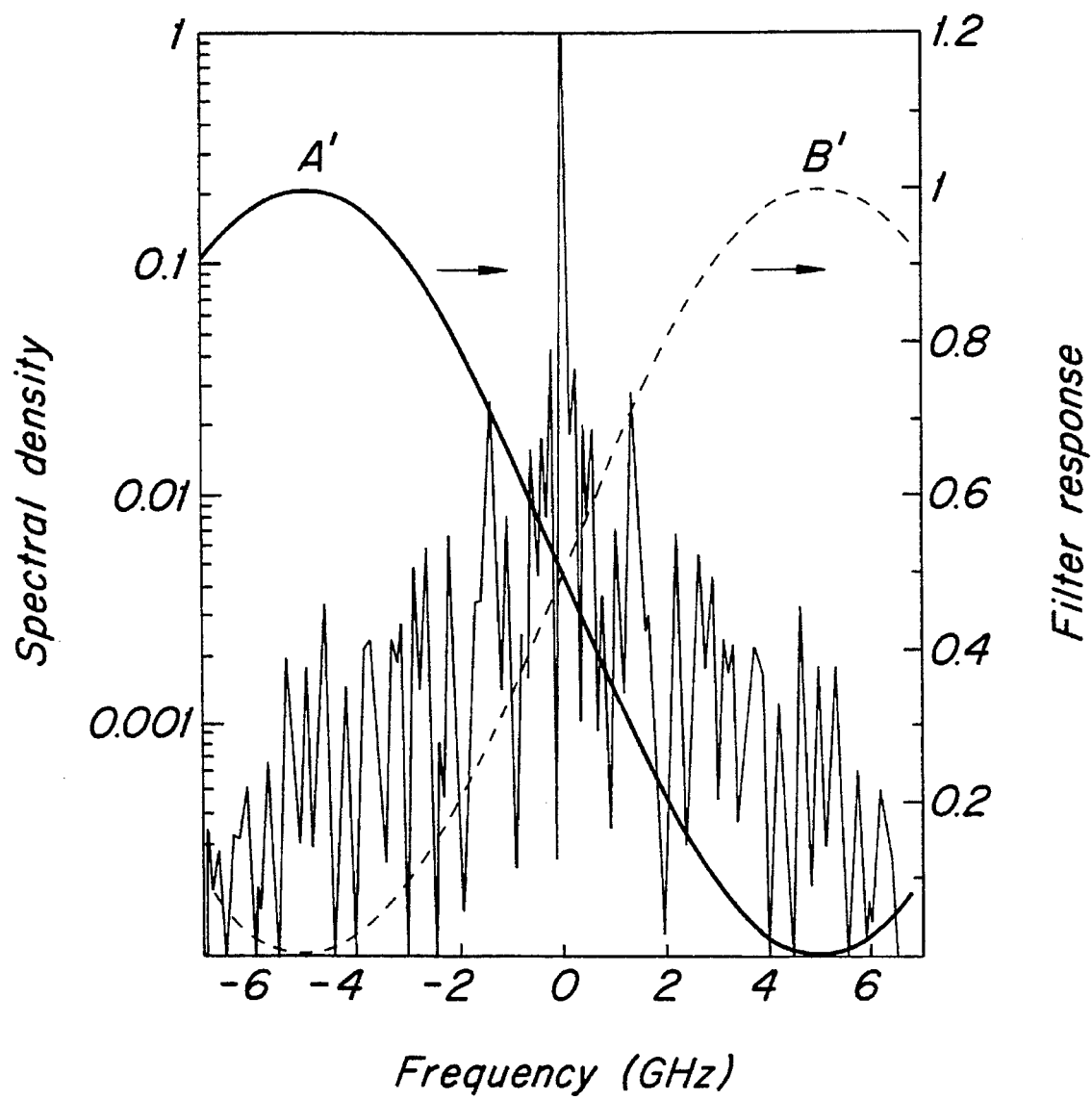
FIG. 5 illustrates a power spectrum for the modulated signal in accordance with FIG. 4, and the transfer function for the two branches of the Mach-Zender interferometer.

FIG. 5 shows a power spectrum for the modulated light signal and the transfer functions for the upper and lower branch, respectively, in the section A'–B' in FIG. 4, analogous with FIG. 2. Thus, the transfer functions are shown for, in this case, the two branches of the Mach-Zender interferometer.

In the following an example is shown in which the receiver is assumed to be ideal. It is furthermore assumed that the fibre is an ordinary single-mode fibre with a dispersion of 17 ps/nm/km, and the bit rate is assumed to be 10 Gbit/s, whereas the wavelength is set at 1.55 μm.

As modulation format, NRZ (Non Return to Zero) has been chosen, with a pulse shape corresponding to cosine raised to the second power. In this connection it is assumed that signal power is present up to 0.7×the clock frequency.

Figure 6:
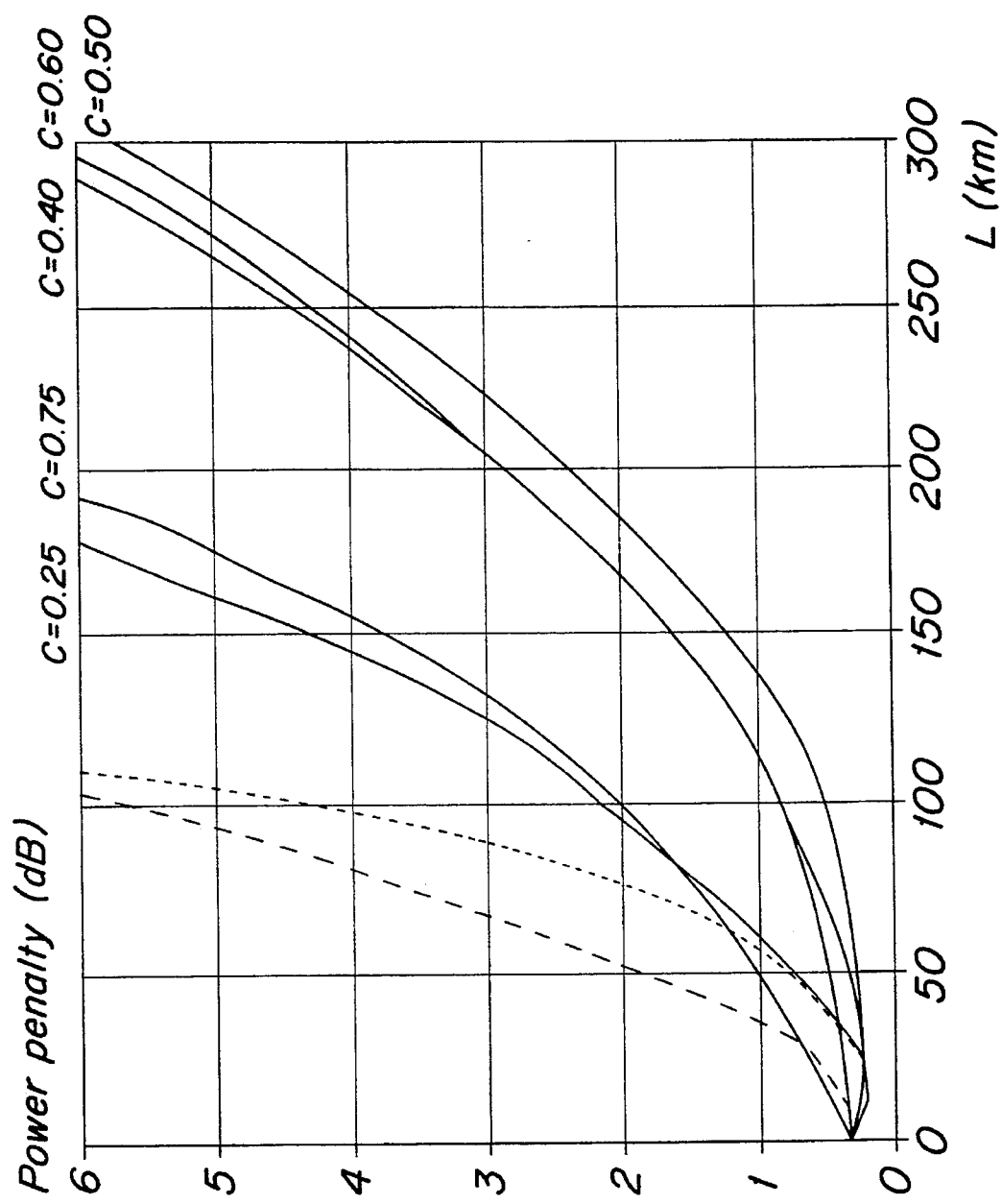
FIG. 6 shows a comparison of the transmission distance for different values of C.

In FIG. 6 there is illustrated the power penalty (Optical Power Penalty) as a function of the transmission distance L for three different cases; without compensation which corresponds to a dashed line, with a blue-shifted pulse which corresponds to a dotted line, and compensation in accordance with the invention with different values of C which is illustrated with continuous lines. From the diagram, it is evident that maximum dispersion compensation is obtained for values of C of approximately 0.5. With these assumptions, the maximum transmission distance would amount to approximately 3.6×uncompensated transmission distance. The fact that the transmission distance does not amount to a factor 4 can be explained by, amongst other things, the fact that the assumed signal has a non-ideal power spectrum, i.e. the weight function for the power spectrum is in reality not 1. The transmission distance thus depends on the signal spectrum and, with an ideal signal spectrum, a factor 4 in delayed transmission distance would be possible. With a value of C of approximately 0.5 to 0.6, lengthened transmission distances of about 3 to 3.5 would be possible but these are solely examples of values for this described case.

The devices described above and the respective corresponding methods are utilized for compensation of the dispersion in fibre optic transmission systems with high bit rates in which the dispersion otherwise constitutes a limiting factor with respect to the length of the transmission distances which are possible without an electro-optic regeneration. Theoretically, with the devices described in accordance with the invention, the transmission distances may be extended up to a factor 4. The amount of extension of the transmission distances, i.e. how close to the factor 4 it is possible to come, depends amongst other things on how sharp optic filters or wavelength sorting devices that may be produced. In general, the higher bit rates that occur, the more easy it is to produce well-functioning optic filters.

The invention is not of course to be limited to the described embodiments, but may be varied freely within the scope of the claims. The device may for instance be arranged at the receiver side of the transmission system, though it may also be arranged along the transmission distance.

We claim:

1. A device for compensating dispersion of an optical signal having an upper sideband and a lower sideband in a fiber optic transmission system comprising:

a splitter for spectrally splitting the optical signal into an upper signal having the upper sideband and a lower signal having the lower sideband;

a delay device for selectively delaying the upper and lower signals to compensate for a difference between a transmission time of the upper signal and a transmission time of the lower signal; and a combiner for coherently combining the selectively delayed upper and lower signals produced by the delay device and for producing a compensated optical signal.

2. The device of claim 1, wherein the delay device comprises two single-mode waveguides having different lengths and in which the upper and lower signals have substantially the same group velocity.

3. The device of claim 1, wherein the delay device includes a fiber optic delay line.

4. The device of claim 3, wherein the combiner includes at least one device for active control of a phase of at least one of the selectively delayed upper and lower signals.

5. The device of claim 1, wherein the splitter comprises a fiber splitter and optical bandpass filters disposed in each of the fiber splitter's branches and having spectrally narrow transfer functions.

6. The device of claim 5, wherein the fiber splitter comprises a passive 3 dB coupler.

7. The device of claim 1, wherein the splitter, delay device, and combiner are discrete fiber components.

8. The device of claim 1, wherein the splitter, delay device, and combiner are one of monolithically integrated on a semiconductor substrate and integrated in one of a polymer material and $SiO_2$.

9. The device of claim 1, wherein the splitter includes Fabry-Perot interferometers for filtering out the upper and lower signals.

10. The device of claim 8, wherein the splitter includes resonant laser amplifier filters.

11. The device of claim 1, wherein the splitter comprises a fiber splitter and a wavelength sorting device.

12. The device of claim 11, wherein the wavelength sorting device has two branches of different lengths and the combiner comprises a directional coupler in which the selectively delayed upper and lower signals are combined.

13. The device of claim 12, wherein the wavelength-sorting device is a Mach-Zender interferometer.

14. The device of claim 12, wherein the wavelength-sorting device includes a grating.

15. The device of claim 12, wherein the directional coupler has a length that is half of a coupling length.

16. The device of claim 11, wherein the splitter, delay device, and combiner are discrete fiber components.

17. The device of claim 11, wherein the splitter, delay device, and combiner are monolithically integrated in a semiconductor.

18. The device of claim 11, wherein the splitter delay device, and combiner are integrated in one of a polymer material and $SiO_2$.

19. The device of claim 1, wherein the device is disposed at a receiver side of the transmission system.

20. The device of claim 19, further comprising a detecting device for detecting the compensated optical signal.

21. A method for compensating dispersion of an optical signal in a fiber optic transmission system, the optical signal having upper and lower modulation sidebands, comprising the steps of:

splitting the optical signal into an upper signal having the upper modulation sideband and a lower signal having the lower modulation sideband;

selectively delaying the upper and lower signals to compensate a transit time difference between the upper and lower modulation sidebands; and coherently combining the upper and lower signals to form a compensated optical signal.

22. The method of claim 21, wherein the delaying step comprises propagating each of the upper and lower signals a respective distance with substantially the same group velocity.

23. The method of claim 21, wherein the optical signal, after splitting, is filtered for obtaining the upper and lower signals.

24. The method of claim 21, wherein the optical signal is split into the upper and lower signals which propagate in two branches which are of different lengths, after which the upper and lower signals are combined in a directional coupler for sorting wavelengths in the signals.

25. The method of claim 21, wherein the steps are carried out at a receiving side of the transmission system.

26. The method of claim 25, further comprising the step of detecting the compensated optical signal.

* * * * *